3,517,108
NAVIGATION SIGNAL SIMULATOR
William F. McCarthy, Abington, Pa., assignor to the United States of America as represented by the Secretary of the Navy
Filed Aug. 30, 1967, Ser. No. 665,202
Int. Cl. G09b 9/02
U.S. Cl. 35—10.2      10 Claims

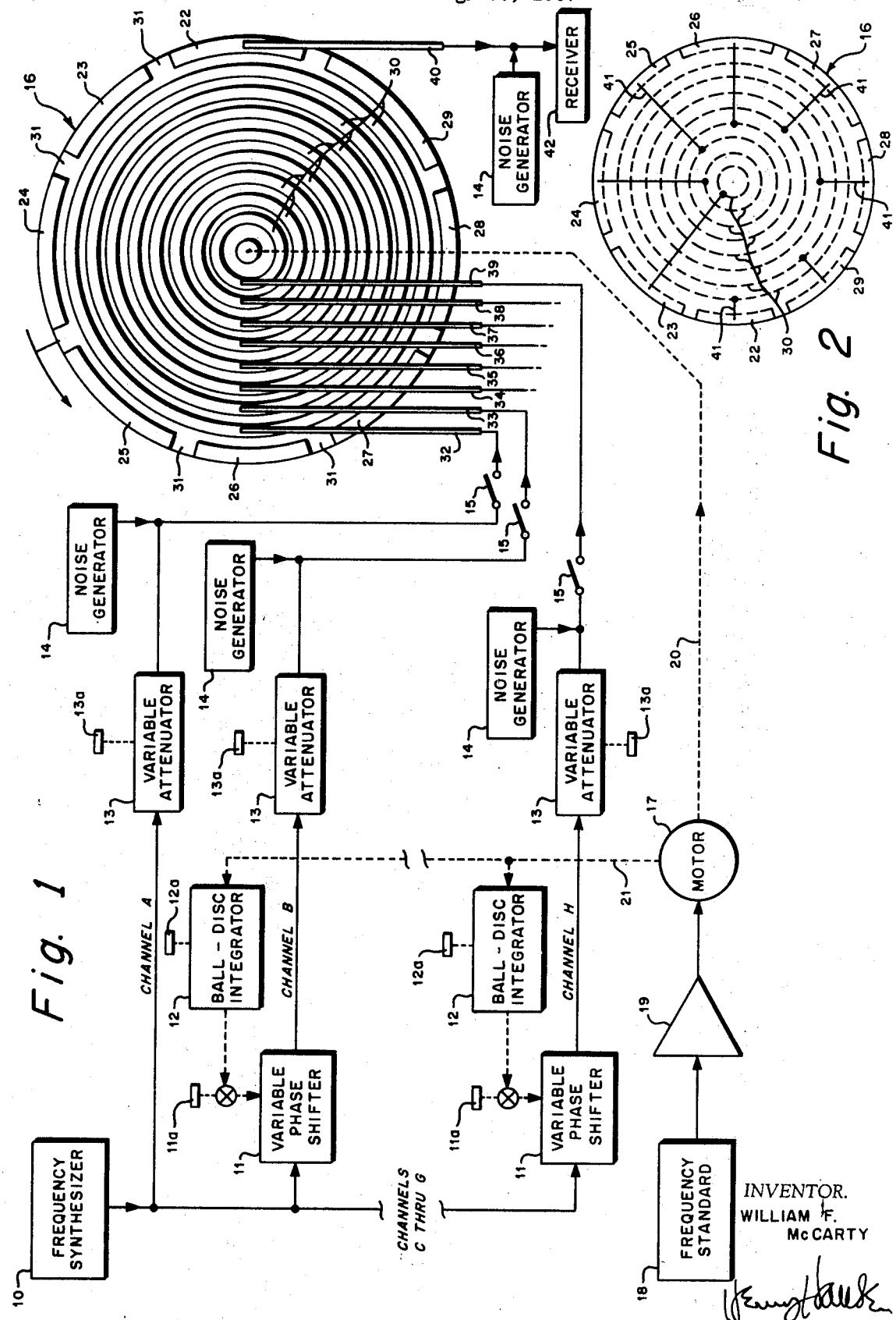

ABSTRACT OF THE DISCLOSURE

Apparatus for simulating the transmitted signals which an OMEGA navigation system receiver station would receive when in an aircraft, ship or other vessel and including a plurality of electrical channels, each of which simulates a VLF signal of an OMEGA transmitter. The phase and rate of change thereof, amplitude, and noise content of each VLF signal can be varied. A constant speed signal commutator, driven by a frequency controlled synchronous motor, sequentially samples the respective channels.

STATEMENT OF GOVERNMENT INTEREST

The invention described herein may be manufactured and used by or for the Government of the United States of America for governmental purposes without the payment of any royalties thereon or therefor.

BACKGROUND OF INVENTION

The invention relates generally to simulators, and more particularly to an apparatus for simulating the OMEGA navigation system as contemplated for world-wide operation. OMEGA evolved from the need for a navigation system with global coverage and high accuracy and provides navigation data day or night, under all weather conditions to a range of better than 5,000 miles with a position accuracy of 1 to 2 nautical miles or better. Therefore, radio navigation systems in general use were range-limited and operated effectively only over relatively small geographical regions.

Simulators as applied to navigational receivers produce electrical signals representative of the signals obtained during operation of a navigation system. They are used to test, evaluate and calibrate the receivers, and are used to train and indoctrinate personnel in the use of the system. However, the prior art simulators are completely unadaptable for use with the OMEGA receivers due to the unique characteristics and relationships of the radio signals involved.

SUMMARY OF INVENTION

Accordingly, it is a general purpose of the present invention to provide a simulator which will simulate operation of the OMEGA navigation system at the input to a receiver of the system.

This result is accomplished by means of resolvers for shifting the relative phase of any or all of the simulated transmitted signals and, in conjunction therewith, by phase controller means for simulating the various rates of change of phase shift that a receiver station would "see" if it were in motion. To simulate signal propagation attenuation, variable attenuators are provided for adjusting the relative amplitude of any or all of the simulated, transmitted signals. ON/OFF switches simulate loss of signal from any or all of the transmitter stations. Noise generators inject simulated atmospheric or other noise into any or all of the simulated signals and, concurrently therewith, vary the signal-to-noise ratio thereof. A signal commutator, driven at a constant speed by a frequency controlled synchronous motor, sequentially samples the output signals from the simulated transmitters and feeds these signals into an OMEGA receiver. By varying any or all of the above parameters (i.e., phase, amplitude, noise, etc.,) the performance of the receiver may be evaluated.

BRIEF DESCRIPTION OF THE DRAWING

FIG. 1 is a schematic block diagram of the simulator including a view of the commutator element having a plurality of electrically conductive concentric rings or bands; and FIG. 2 diagramatically illustrates the manner in which the rings or bands of FIG. 1 are electrically connected, each such ring or band being represented by a single, dashed circle.

DESCRIPTION OF THE PREFERRED EMBODIMENT

The OMEGA navigation system may be described as a time-shared, CW radio navigation system in which measurements are in terms of the relative phase of the received signals, rather than the time of arrival of pulses. In operation, the navigation receiver measures the phase difference of signals received from two pairs of OMEGA stations, a minimum of three transmitters being necessary to provide a navigational "fix." Each measured phase difference determines a single line of position or isophase hyperbolic line. Receiver location is established by the intersection of two such hyperbolic lines.

As applied to the illustrated embodiment, the OMEGA system utilizes eight strategically positioned transmitters to provide world-wide coverage. Transmissions occur cyclicly over a ten second repetition interval divided into eight separate time segments, each time segment being utilized in sequence by each successive transmitter. Each of the aforementioned time segments differs slightly in duration, although the OFF time or time between transmissions is equal. Thus, the second transmitter in a particular sequence may emit a signal for 1.0 second 0.2 second after the first transmitter has emitted. The first transmitter may have emitted for 0.9 second. Moreover, 0.2 second after the last transmitter in the sequence has emitted, the first transmitter again emits a signal for the same duration as it emitted 10 seconds earlier.

It is this sequence of signals, along with the attendant variations in phase and rate of change thereof, as well as amplitude and noise content, that the present invention simulates.

Referring now to the drawing, more particularly to FIG. 1, there are shown three channel networks, labeled A, B, and H, channels D–G inclusive, understood to be identical to channels B and H and interposed therebetween thus comprising a total of eight channels substantially connected in parallel and constructed such that each channel simulates an OMEGA transmitter. It is, of course, understood that a greater or lesser number of channels may be utilized in the simulator as desired, without digressing from the spirit or scope of the invention, the eight channels shown representing an eight-transmitter system.

A frequency synthesizer 10 generates a 10.2 kHz. sine wave signal which is fed into all channels simultaneously. In channels B–H the signal is fed into respective resolver-type variable phase shifters 11, which may be manually rotated by external means such as a control knob 11a, or driven at variable rates by means of controllers therefor comprising ball disk integrators 12 such as disclosed in U.S. Pat. 2,602,338. The output signals from the resolvers plus the channel A signal are fed in parallel through respective variable attenuator elements 13 and ON/OFF switches 15 to electrically conductive brushes 32, 33, 34, 35, 36, 37, 38, and 39, of a commutator 16. Also inserted in each channel are noise generators 14, controlled from an external source (not shown) which may be used individually, sequentially, or in combination to simulate atmospheric or other noise interference. In addition, a noise generator 14 shown connected at the simulator output provides noise in lieu of, or in addition to, the aforementioned noise generators 14 in each channel.

The electrically conductive brushes 32–39, inclusive, make wiping or sliding electrical contact with the segments 22, 23, 24, 25, 26, 27, 28, and 29, and the rings 30 of the commutator 16. A synchronous motor 17 drives the commutator 16 through an appropriate mechanical linkage 20. Motor 17 also drives the integrators 12 through a mechanical linkage 21. The commutator 16 samples the output signals from each of the channels in sequence (in a manner hereinafter described) and feeds the sampled signals to the OMEGA receiver 42 through commutator contact brush 40. The sampling rate is 6 r.p.m. for a 10 second sequence. This sampling rate is kept constant by means of a crystal controlled frequency standard 18, the output of which feeds a power amplifier 19 to drive the synchronous motor 17 at the desired speed.

It is necessary that the signals appearing at brushes 32–39 be sampled in the proper sequence and that the sampling time for each signal be maintained for fixed, predetermined, discrete intervals. It is seen that for a constant speed of rotation, the sampling time for each signal is determined by the length of each of the electrically conductive segments 22–29. Separation of the signals is determined by means of the blank or insulated portions 31 between each respective segment. Each segment is electrically connected to a respective inner ring 30 (FIG. 2) such as by conductor 41. Brushes 32–39 make electrical contact with the inner rings of the commutator while brush 40 makes electrical contact with the segments 22–29. These brushes are maintained in direct physical contact with the inner rings and segments and may be provided with a mechanical expedient such as, for example, a threaded bolt at the rearward ends to provide whereby the pressure exerted by the brushes may be varied to assure sufficient contact. Further, micrometer-type adjustment might be incorporated to provide a degree of lateral brush motion, thereby to additionally preclude intermittent contact.

As mentioned hereinabove, the ON times, in seconds, of the eight OMEGA transmitters are of predetermined duration. The actual times are 0.9; 1.0; 1.1; 1.2; 1.1; 0.9; 1.2; and 1.0 seconds. The spacing between transmissions is constant at 0.2 second.

The length of arc of the segments 22–29 are such as to correspond exactly with the ON times recited above. The insulated spacing 31 is maintained at 0.2 second. The table below shows the correspondence between the percent (%) of the 10 second sequence and the 360° of the commutator. Individual as well as cumulative data is provided.

ON-OFF TIMES FOR THE SIMULATOR

| Channel | Space | Percent of 10 second sequence | Individual degrees of rotation | Cumulative degrees of rotation |
|---|---|---|---|---|
| A |   | 9 | 32.4 | 32.4 |
|   | x | 2 | 7.2 | 39.6 |
| B |   | 10 | 36.0 | 75.6 |
|   | x | 2 | 7.2 | 82.8 |
| C |   | 11 | 39.6 | 122.4 |
|   | x | 2 | 7.2 | 129.6 |
| D |   | 12 | 43.2 | 172.8 |
|   | x | 2 | 7.2 | 180.0 |
| E |   | 11 | 39.6 | 219.6 |
|   | x | 2 | 7.2 | 226.8 |
| F |   | 9 | 32.4 | 259.2 |
|   | x | 2 | 7.2 | 266.4 |
| G |   | 12 | 43.2 | 309.6 |
|   | x | 2 | 7.2 | 316.8 |
| H |   | 10 | 36.0 | 352.8 |
|   | x | 2 | 7.2 | 360.0 |

The operation of the simulator will now be described. An OMEGA receiver 42 is connected by means of direct electrical connection to the output of the signal simulator as shown in FIG. 1. To test the receiver performance, variable phase shifters 11 are all initially set to 0° as by adjusting control knobs 11a therefore and switches 15 are placed in the ON or closed position. Under these conditions, a zero phase difference measurement should be made by receiver 42. Any measurement other than zero indicates a deficiency or error in the phase resolution circuitry of the receiver. If, however, upon setting the variable phase shifters 11 to zero, it is noted that the receiver output is also zero, the accuracy of the receiver to changes in phase may be determined. To test this accuracy, one of the variable phase shifters, for example, the phase shifter channel B, is changed externally from 0° to some value, say 90°. As the commutator 16 rotates brushes 32 and 33, as well as brushes 34 through 38, and brush 39 make sliding contact with rings 30. In addition, brush 40 will sweep along the segments 22–29 and in so doing alternately contact with segments 22, 29, and 28, for sequential periods of 0.9, 1.0, and 1.1 seconds, 0.2 second separating each of the signals. The receiver 42 should then perform the phase subtractions between channels B and A and channels B and H. A phase difference of 90° should be measured in both phase subtractions. Although it is possible for the receiver 42 to subtract phase of channel H from that of channel A and phase of channel H from that of channel B, and while this information may be desirable, the receiver is designed to perform the first mentioned subtraction. Any phase measurement other than 90° will indicate a need to calibrate the receiver. The amount of deviation from the 90° optimum result will provide information as to the amount or error present in the receiver.

Either as separate tests or as part of the phase testing technique, the relative amplitudes of any or all of the signals may be lessened or increased by adjusting any or all of the variable attenuator elements 13 as by using respective control knobs 13a, thereby simulating actual signal attenuation. In addition, the noise generators 14 may be turned on either individually or in any desired combination to simulate atmospheric or other noise which may be present in actual operation.

If the receiver is in motion, as will generally be the case, the signals which it receives will be constantly changing in phase. To simulate this phenomenon, integrators 12 are utilized. By oppropriate setting of these integrators as by adjusting control knobs 12a, the rate of change of phase of any one or combination of the variable phase shifters 11 may be made to vary such that the receiver circuitry, receiving changing rates of phase, reacts as though it were in motion and, consequently, may be tested as such. Also, any one or combination of switches 15 may be opened to open-circuit a channel (or channels), thereby simulating loss of transmission. Further, these tests may be run in any combination to test the performance of the receiver. For example, the variable attenuator 13 of channel A may be increased concurrently with increasing the noise and varying the rate of change of phase of the signal in channel B as well as changing the phase of the signal in channel H.

It is to be understood that the above-described arrangements are illustrative of the application of the principles of the invention and of a preferred embodiment for the practicing thereof. It will of course be recognized that numerous modifications and alterations may be made in the above-described simulator without departing from the spirit or scope of the invention.

It is quite feasible to employ a single crystal controlled frequency source both to generate the 10.2 kHz. signal and to drive the synchronous motor. Another feature which might be incorporated is the inclusion of other VLF frequencies in addition to the basic 10.2 kHz. signal currently employed. VLF signals of 13.6 kHz. and 11.33 kHz. are currently in use with the OMEGA system and means are provided for obtaining a phase difference between these and the basic 10.2 kHz. signal in various combinations such that further navigation information may be obtained. Accordingly, it is to be expressly understood that the scope of the present invention is to be limited only by the scope of the appended claims.

What is claimed is:
1. A signal simulator comprising:
signal synthesizing means (10) for providing an output signal of predetermined frequency;
a plurality of parallel electrical channels (A, B, C, D, E, F, G, H) receiving said signal;
variable phase shift means (11) in each of said channels but one and connected to receive said output signal for changing the phase of said signal;
commutator means (16) connected to receive the outputs of each of said channels and to transmit said channel outputs in sequence for different intervals; and
motor means drivingly connected to said commutator for rotating the said commutator at constant speed.

2. A simulator according to claim 1 further comprising:
attenuator means (13) serially connected in at least one of said channels for varying the amplitude of said signal thereof.

3. A simulator according to claim 2 further comprising:
adjusting means (12) operatively connected to said phase shift means for varying the phase shift introduced thereby at a predetermined rate.

4. A simulator according to claim 3 further comprising:
noise generating means (14) electrically connected to each of said channels for providing thereto a noise signal.

5. A simulator according to claim 4 further comprising:
switch means (15) in at least one of said channels for interrupting the provision of said signal to said commutator means.

6. A simulator according to claim 1 wherein said commutator means includes:
a planar disk including a plurality of concentric, annular electrically conductive surfaces separated by nonconductive surfaces, and a segmented concentric arrangement of conducting surfaces of different peripheral lengths and separated between their confronting ends by nonconducting surfaces of equal peripheral lengths;
a plurality of brushes, one of said brushes radially positioned for operatively contacting said segmented arrangement of surfaces and electrically connected to the output of said commutator means, the other of said brushes operatively contacting respective ones of said concentric annular surfaces and electrically connected respectively to each of said channels; and
means electrically connecting said annular surfaces with respective ones of said surfaces in said segmented arrangement.

7. A simulator according to claim 6 wherein the peripheral lengths of said conducting surfaces in said segmented arrangement vary between predetermined lengths.

8. A simulator according to claim 7 wherein said motor further comprises:
means for producing a constant frequency power supply for maintaining a constant speed output.

9. Apparatus according to claim 8 further comprising:
noise generator means electrically connected as its output to the output of said commutator means.

10. An electrical commutator comprising:
a nonconductive movable support means;
a plurality of continuous conductors affixed at the surface of said support means in plural endless paths, parallel to and electrically separated from each other;
at least one segmented conductor affixed to the surface of said support means in endless paths, parallel to said plurality of endless conductors;
connecting means in said commutator for electrically connecting each conductor of said plurality of continuous conductors to a respective segment of said segmented conductor;
a plurality of stationary contactors positioned for continuously registering with respective ones of said plurality of continuous conductors, and sequentially registering with respective conductors of said segmented conductor; and
drive means operatively connected to drive said support means along the length of said paths relative to said contactors.

References Cited

UNITED STATES PATENTS

| | | | |
|---|---|---|---|
| 2,660,720 | 11/1953 | Dehmel | 35—10.2 X |
| 2,947,088 | 8/1960 | Zahner et al. | 35—10.2 |
| 3,358,284 | 12/1967 | Millar et al. | 343—106 |
| 1,815,786 | 7/1931 | Long | 178—52 X |
| 1,893,365 | 1/1933 | Hall | 340—41 X |
| 2,248,923 | 7/1941 | Hanley | 178—53.1 |
| 2,956,121 | 10/1960 | Dingley | 178—52 X |
| 2,034,364 | 3/1936 | Whitney et al. | 340—364 X |
| 3,056,956 | 10/1962 | Retzinger | 328—61 X |
| 3,108,267 | 10/1963 | Giel | 340—364 |

EUGENE G. BOTZ, Primary Examiner

R. W. WEIG, Assistant Examiner

U.S. Cl. X.R.

178—52; 340—357, 364; 339—8; 331—78; 328—61; 310—237

UNITED STATES PATENT OFFICE
CERTIFICATE OF CORRECTION

Patent No. 3,517,108          Dated June 23, 1970

Inventor(s) William F. McCarty

It is certified that error appears in the above-identified patent and that said Letters Patent are hereby corrected as shown below:

At the top of the drawing "McCarthy" should read -- McCarty --.

Column 1, line 3, "McCarthy" should read -- McCarty --.

SIGNED AND SEALED
NOV 24 1970

(SEAL)
Attest:

Edward M. Fletcher, Jr.
Attesting Officer

WILLIAM E. SCHUYLER, JR.
Commissioner of Patents